United States Patent
Maekawa

(10) Patent No.: US 9,069,758 B2
(45) Date of Patent: Jun. 30, 2015

(54) COMMUNICATION DEVICE SUPPYING IMAGE DATA INCLUDING REQUESTED INFORMATION IN FIRST AND SECOND LANGUAGES

(75) Inventor: Yohei Maekawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 432 days.

(21) Appl. No.: 13/361,727

(22) Filed: Jan. 30, 2012

(65) Prior Publication Data

US 2012/0221322 A1   Aug. 30, 2012

(30) Foreign Application Priority Data

Feb. 28, 2011   (JP) .................................. 2011-043280

(51) Int. Cl.
*G06F 17/28* (2006.01)
*G06F 17/30* (2006.01)

(52) U.S. Cl.
CPC ........ *G06F 17/289* (2013.01); *G06F 17/30893* (2013.01)

(58) Field of Classification Search
CPC .. G06F 17/28; G06F 17/289; G06F 17/30893
USPC .................. 704/2, 3, 7, 8, 277; 715/264, 265
See application file for complete search history.

(56) References Cited

U.S. PATENT DOCUMENTS

| | | | | |
|---|---|---|---|---|
| 5,517,409 A | * | 5/1996 | Ozawa et al. | 704/3 |
| 5,526,268 A | * | 6/1996 | Tkacs et al. | 704/8 |
| 5,583,761 A | * | 12/1996 | Chou | 715/201 |
| 5,946,376 A | * | 8/1999 | Cistulli | 704/8 |
| 6,119,078 A | * | 9/2000 | Kobayakawa et al. | 704/3 |
| 7,627,479 B2 | * | 12/2009 | Travieso et al. | 704/277 |
| 7,757,227 B2 | * | 7/2010 | Duplessis et al. | 704/8 |
| 7,784,026 B1 | * | 8/2010 | Wong | 717/109 |
| 8,260,064 B2 | * | 9/2012 | Konno | 704/2 |
| 8,339,624 B2 | * | 12/2012 | Sakakibara | 704/8 |
| 8,478,579 B2 | * | 7/2013 | Chin et al. | 704/2 |
| 8,484,012 B2 | * | 7/2013 | Takahashi | 704/8 |

(Continued)

FOREIGN PATENT DOCUMENTS

JP   H10-149362 A   6/1998
JP   2000-330992 A   11/2000

(Continued)

OTHER PUBLICATIONS

Japanese Office Action issued in JP 2011-043280, mailed Dec. 17, 2013.

*Primary Examiner* — Martin Lerner
(74) *Attorney, Agent, or Firm* — Merchant & Gould PC

(57) ABSTRACT

A communication device may store first specific data representing specific information described in a first language. The communication device may acquire second specific data from the data server. The second specific data may represent the specific information described in a second language different from the first language. The communication device may supply first image data obtained using the first specific data to a display unit in a case where the specific information described in the first language is requested, and supply second image data obtained using the acquired second specific data to the display unit in a case where the specific information described in the second language is requested.

9 Claims, 8 Drawing Sheets

(56) References Cited

U.S. PATENT DOCUMENTS

| | | |
|---|---|---|
| 8,725,480 B2 * | 5/2014 | Blank et al. .................. 703/10 |
| 2001/0018649 A1 * | 8/2001 | Kasai et al. .................. 704/3 |
| 2002/0091510 A1 * | 7/2002 | Forrest et al. ................ 704/8 |
| 2002/0174150 A1 * | 11/2002 | Dang et al. .................. 707/536 |
| 2003/0120478 A1 * | 6/2003 | Palmquist .................... 704/3 |
| 2003/0200078 A1 * | 10/2003 | Luo et al. .................... 704/2 |
| 2003/0236671 A1 * | 12/2003 | Andersen et al. ............. 704/277 |
| 2004/0044518 A1 * | 3/2004 | Reed et al. ................... 704/8 |
| 2005/0137845 A1 * | 6/2005 | Carroll et al. ................ 704/2 |
| 2005/0171784 A1 | 8/2005 | Fukushima et al. |
| 2006/0100853 A1 * | 5/2006 | McEntee et al. .............. 704/9 |
| 2007/0150500 A1 | 6/2007 | Kawada et al. |
| 2007/0225964 A1 * | 9/2007 | Wu et al. ..................... 704/2 |
| 2008/0233980 A1 * | 9/2008 | Englund et al. .............. 704/2 |
| 2008/0243473 A1 * | 10/2008 | Boyd et al. .................. 704/2 |
| 2008/0263132 A1 * | 10/2008 | Saintloth ..................... 709/203 |
| 2008/0275692 A1 * | 11/2008 | Chen et al. ................... 704/8 |
| 2009/0198486 A1 * | 8/2009 | Chang ......................... 704/2 |
| 2009/0276206 A1 * | 11/2009 | Fitzpatrick et al. ........... 704/2 |
| 2009/0319257 A1 * | 12/2009 | Blume et al. ................. 704/7 |
| 2010/0054612 A1 * | 3/2010 | Konno ......................... 382/229 |
| 2010/0138212 A1 * | 6/2010 | Wang et al. .................. 704/3 |
| 2011/0144972 A1 * | 6/2011 | Koenig ........................ 704/2 |
| 2013/0110494 A1 * | 5/2013 | Elgazzar et al. .............. 704/3 |

FOREIGN PATENT DOCUMENTS

| | | |
|---|---|---|
| JP | 2002-251261 A | 9/2002 |
| JP | 2004-70604 A | 3/2004 |
| JP | 2005-157769 A | 6/2005 |
| JP | 2007-179431 A | 7/2007 |
| JP | 2010-263396 A | 11/2010 |

\* cited by examiner

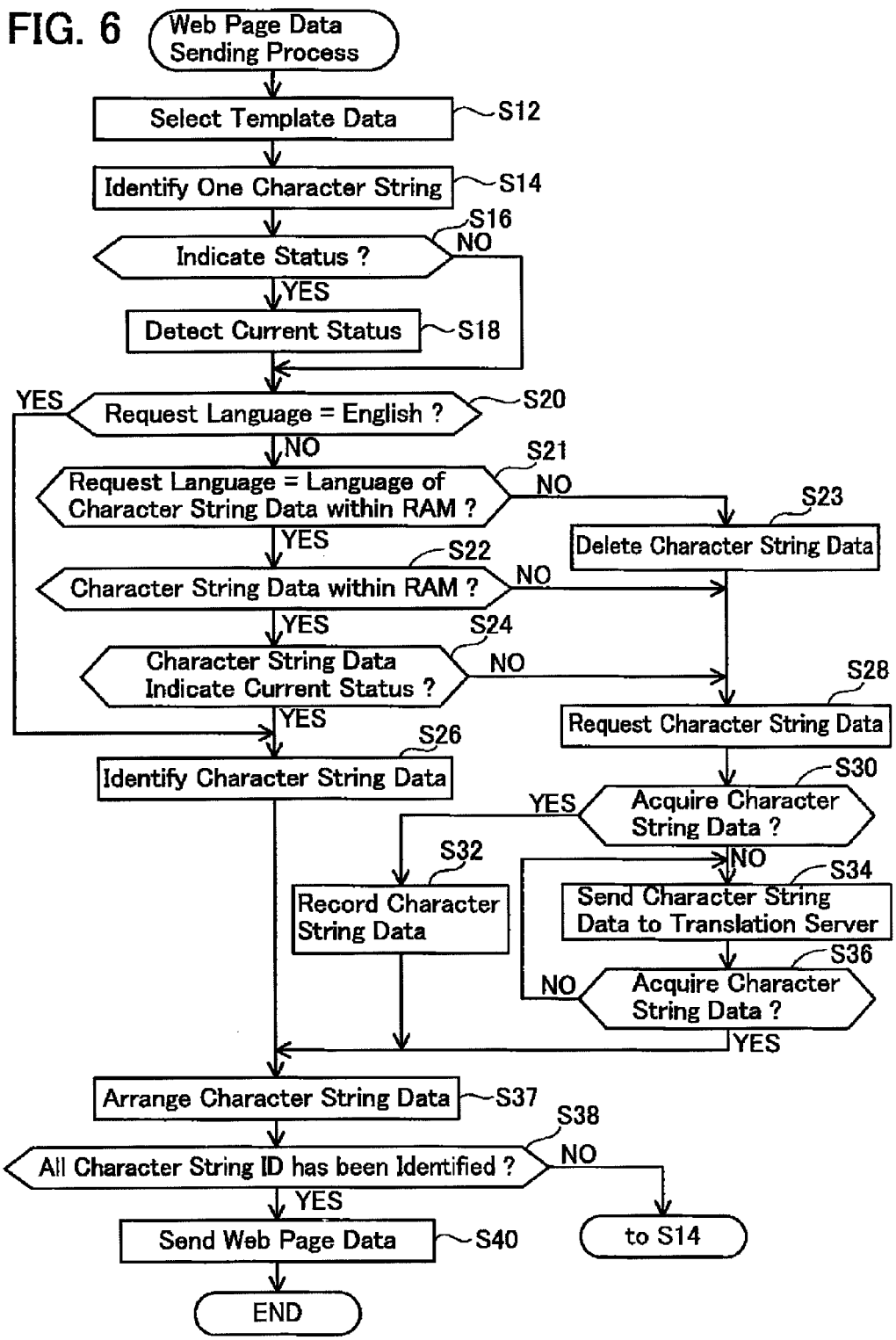

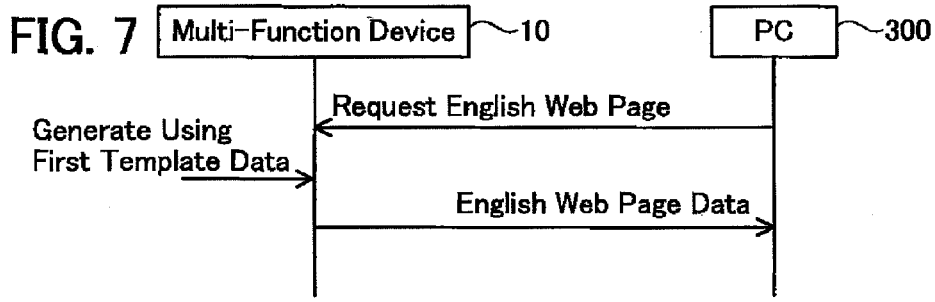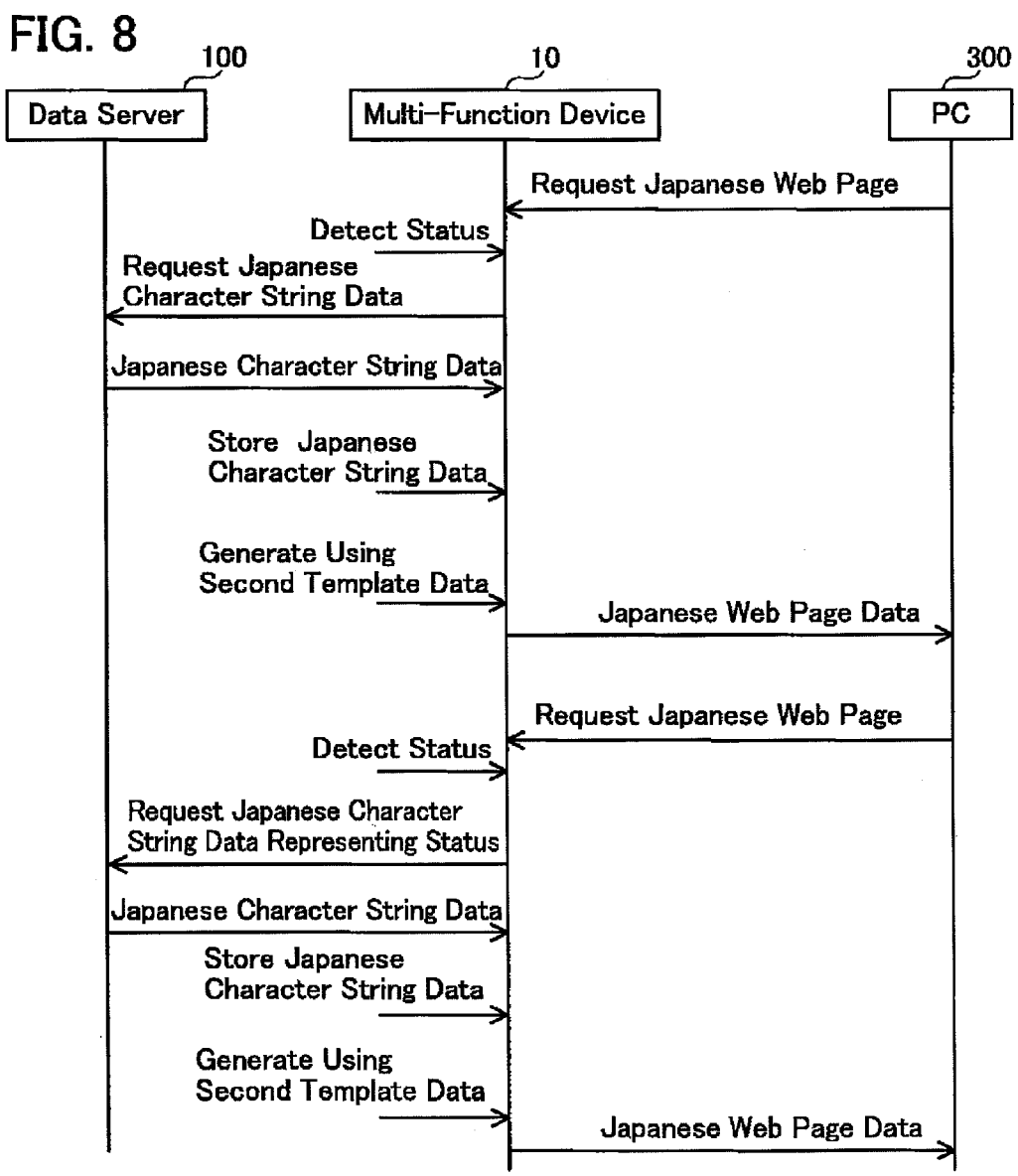

COMMUNICATION DEVICE SUPPYING IMAGE DATA INCLUDING REQUESTED INFORMATION IN FIRST AND SECOND LANGUAGES

CROSS-REFERENCE TO RELATED APPLICATIONS

This application claims priority to Japanese Patent Application No. 2011-043280, filed on Feb. 28, 2011, the contents of which are hereby incorporated by reference into the present application.

TECHNICAL FIELD

The present application discloses a communication device to be connected with a data server via a network.

DESCRIPTION OF RELATED ART

An image outputting device is known that sends display data to an information processing device connected via a LAN. The image outputting device stores plural pieces of display data corresponding to a plurality of languages. Each of the plural pieces of display data includes the same type of information (e.g., job status information) described in the language corresponding to the display data. In a case where display data described in a specific language is requested from the information processing device, the image outputting device sends, from among the plural pieces of display data, the display data corresponding to the specific language to the information processing device.

SUMMARY

In the above-mentioned art, if display data that is not one of the plural pieces of display data stored in advance in the image outputting device is requested, i.e., if display data that is described in a language other than the languages supported by the image outputting device is requested, the image outputting device cannot send the display data.

An art is disclosed in the present specification that may supply image data appropriately to the display unit. Moreover, the image data represents an image that includes information described in the requested language.

An art disclosed in the present application is a communication device to be connected with a data server via a network. The communication device may comprise one or more processors, a memory that stores a computer program including instructions executed by the one or more processors and a first information memory that stores first specific data representing specific information described in a first language. The instructions may cause the one or more processors, when executed by the one or more processors, to function as a first acquiring unit and a first supplying unit. The first acquiring unit may be configured to acquire second specific data stored in the data server from the data server. The second specific data may represent the specific information described in a second language different from the first language. The first supplying unit may be configured to supply first image data obtained using the first specific data within the first information memory to a display unit in a case where the specific information described in the first language is requested. The first image data may represent a first image including the specific information described in the first language. The first supplying may be configured to supply second image data obtained using the acquired second specific data to the display unit in a case where the specific information described in the second language is requested. The second image data may represent a second image including the specific information described in the second language.

Moreover, a control method and a computer program for realizing the communication device described above, and a computer readable recording device in which the computer program is stored are also novel and useful. Further, a system including the communication device, the data server described above and a translation server is also novel and useful.

BRIEF DESCRIPTION OF THE DRAWINGS

FIG. 6 shows a flowchart of a web page data sending process.
FIG. 7 shows a sequence diagram showing operations of devices in a case where a PC requests English.
FIG. 8 shows a sequence diagram showing operations of devices in a case where the PC requests Japanese.

Figure 1:
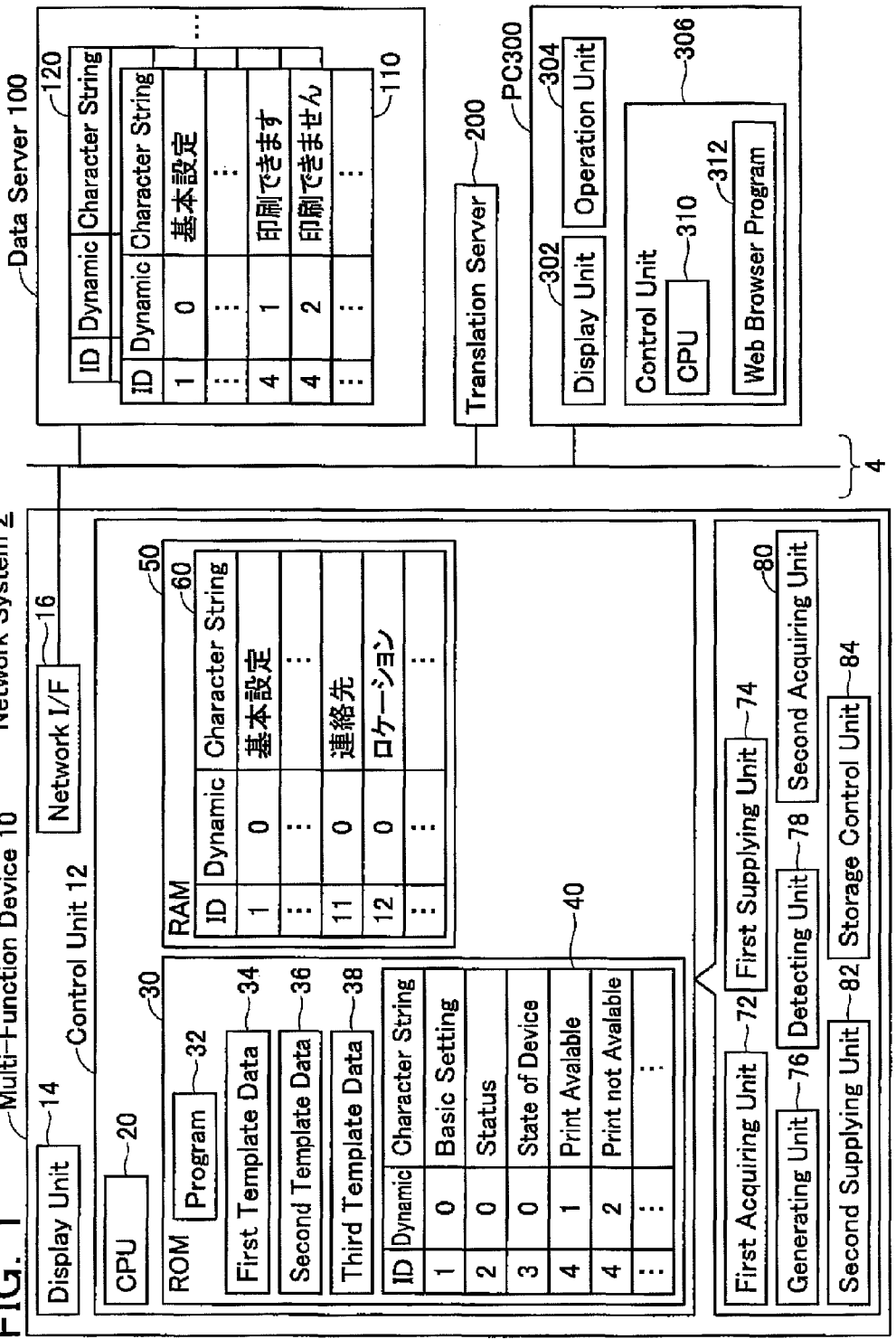
FIG. 1 shows the configuration of a network system.

EMBODIMENT (Configuration of Network System 2)
As shown in FIG. 1, a network system 2 comprises a PC 300, a multi-function device 10 (i.e., a peripheral of the PC 300), a data server 100 and a translation server 200. The devices 10, 100, 200, 300 can communicate with one another via a LAN 4.

(Configuration of Multi-Function Device 10)
As shown in FIG. 1, the multi-function device 10 comprises a control unit 12, a display unit 14 and a network interface 16.

The control unit 12 comprises a CPU 20, a ROM 30 and a RAM 50. The CPU 20 executes various processes according to a program 32 stored in the ROM 30. Thereby, the functions of a first acquiring unit 72, a first supplying unit 74, a generating unit 76, a detecting unit 78, a second acquiring unit 80, a second supplying unit 82 and a storage control unit 84 are realized.

The ROM 30 stores the program 32, plural pieces (three in FIG. 1) of template data 34 to 38 and an English character string table 40. Each of the data 32 to 40 is pre-installed in the multi-function device 10 at the shipping stage of the multi-function device 10. That is, in the present embodiment, since the English character string table 40 is stored in advance in the multi-function device 10, it is assumed that the multi-function device 10 will be sold in an English speaking region. Moreover, in a variant, a character string table of a language other than English may be stored in advance in the multi-function device 10. The program 32 includes a web server program. The multi-function device 10 supplies web page data in response to a request of an external device (e.g., the PC 300).

Each of the template data 34 to 38 is stored in the ROM 30 in combination with language information. For example, first template data 34 is stored in combination with language information indicating English and German. Each of the template data 34 to 38 is data described in a format (HTML (Hyper Text Markup Language), XML (Extensible Markup Language), etc.) which a web browser program 312 of the PC 300 (to be described) is capable of interpreting.

(Configuration of First Template Data 34)

Figure 2:
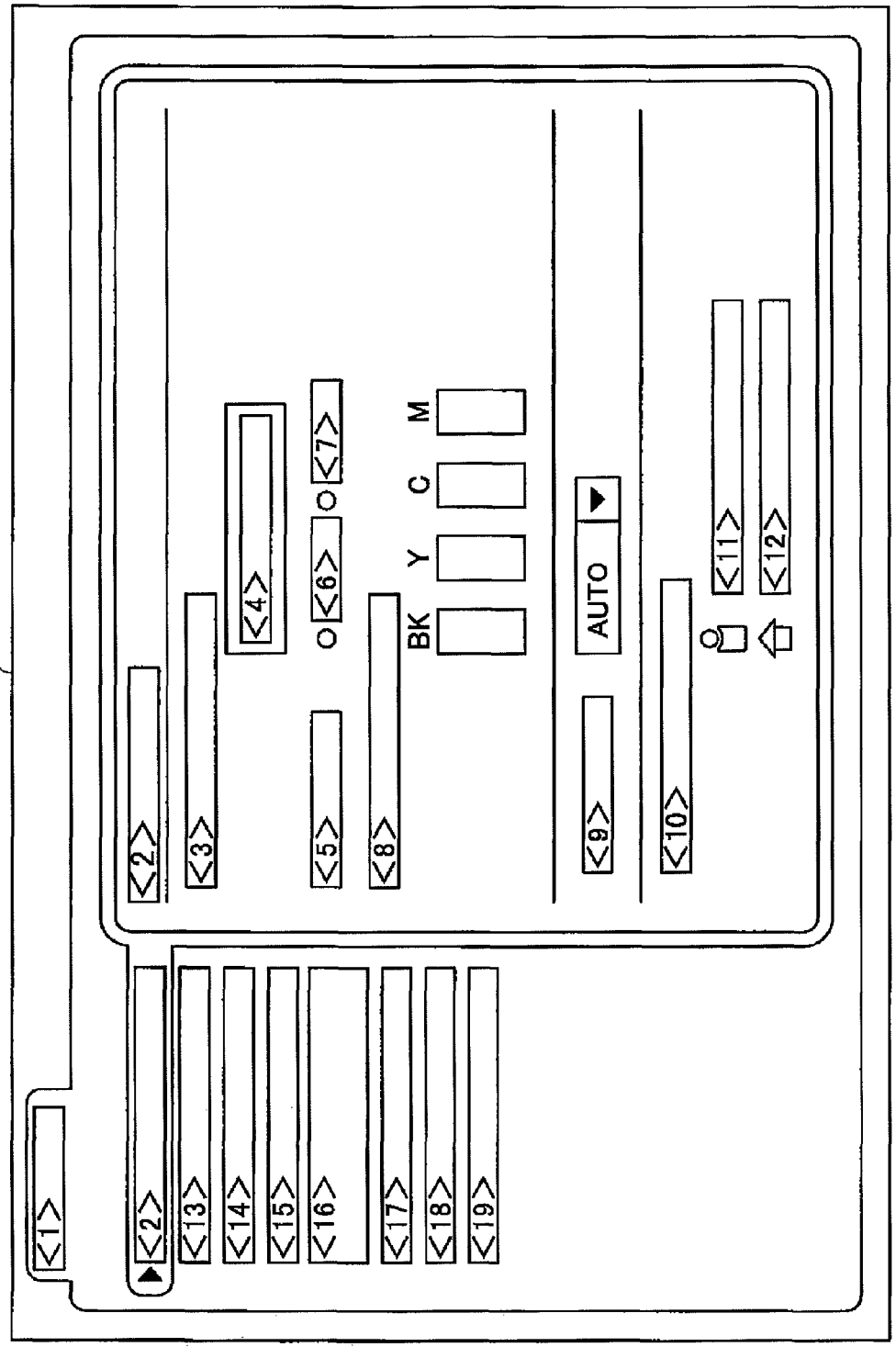
FIG. 2 shows an example of an image represented by first template data.

A predetermined URL is assigned to the first template data 34. As shown in FIG. 2, in the first template data 34, the location is determined for each of a plurality of character string IDs from <1> to <19>. Moreover, the generating unit 76 can generate one piece of web page data using the first template data 34 and the English character string table 40. The generating unit 76 generates web page data having a format (HTML, XML, text, etc.) which the web browser program 312 of the PC 300 (to be described) is capable of interpreting.

As shown in FIG. 1, a combination of character string ID, dynamic variable and English character string data is recorded in the English character string table 40.

(Web Page Data Generating Process)

Figure 3:
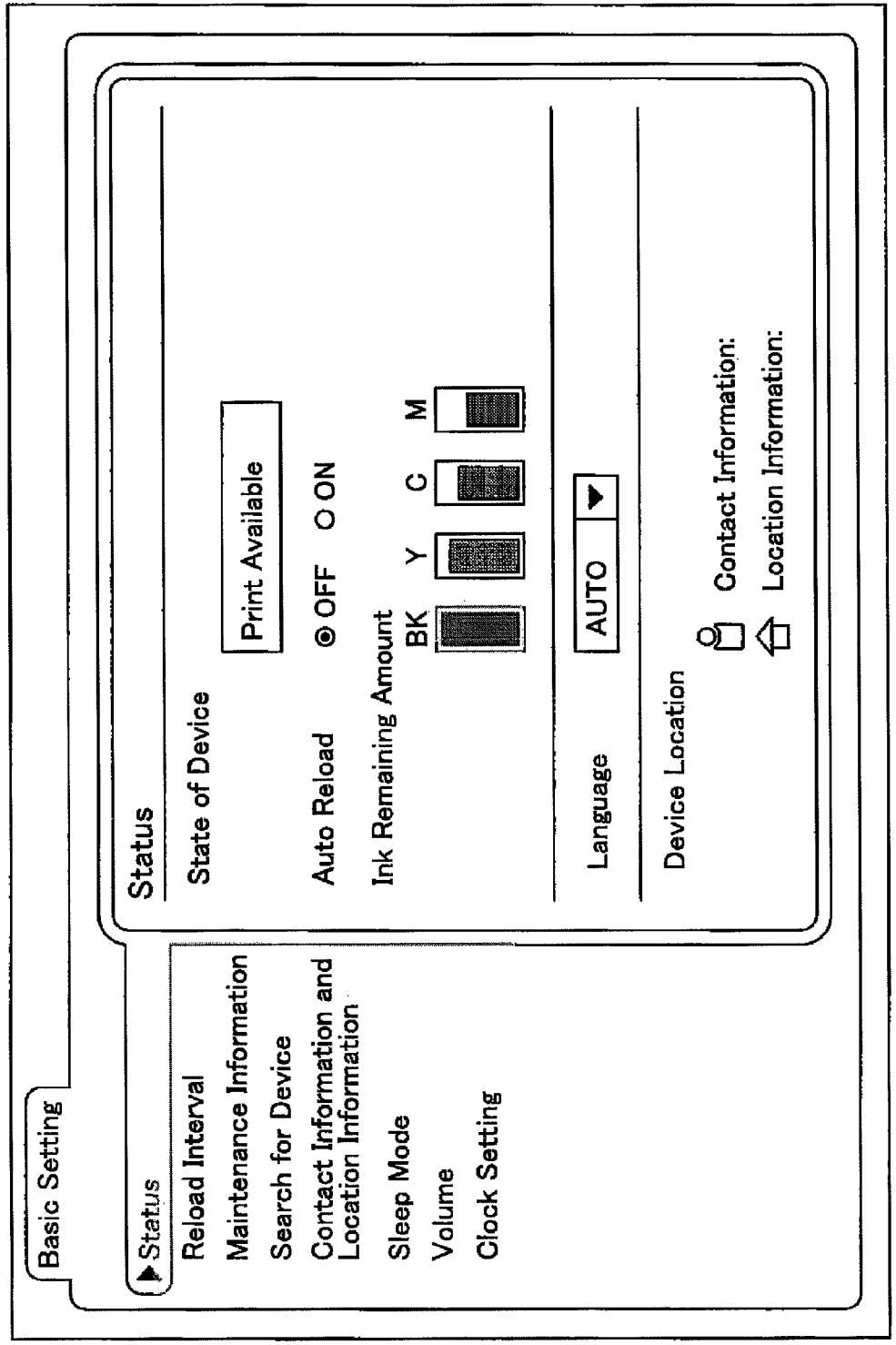
FIG. 3 shows an example of an English web page.

Next, a process of the generating unit 76 for generating the web page data using the first template data 34 and the English character string table 40 will be described. As shown in FIG. 3, the generating unit 76 generates the web page data by arranging, for each character string ID included in the first template data 34, at the location of the character string ID, character string data recorded in the English character string table 40 in combination with the character string ID. For example, "Basic Setting", which is character string data recorded in combination with the character string ID <1> of the English character string table 40, is arranged at the location of the character string ID <1> of the first template data 34 of FIG. 2. In detail, the generating unit 76 arranges the character string data so that the character string "Basic Setting" represented by the character string data is fitted in the location (i.e., area) of the character string ID <1> of the first template data 34.

Moreover, character string data recorded in combination with a dynamic variable whose value is other than "0" in the English character string table 40 is character string data representing the status of the multi-function device 10. The status of the multi-function device 10 is dynamically changing information such as, for example, information indicating whether the multi-function device 10 can currently print, information indicating remaining paper amount, etc. Consequently, a plurality of character strings representing the dynamically changing status of the multi-function device 10 is stored in combination with the same character string ID in the English character string table 40. For example, "Print Available" and "Print Not Available" are recorded in combination with the character string ID <4> in the English character string table 40. The state variables representing the current status of the multi-function device 10 are stored in the RAM 50. The generating unit 76 identifies the state variables representing the current status of the multi-function device 10 from the RAM 50. The generating unit 76 selects, from the character string data of the character string ID <4> (e.g., "Print Available", "Print Not Available"), the character string data (e.g., "Print Available") recorded in combination with the dynamic variable matching the state variable which, from among the state variables representing the current status of the multi-function device 10, relates to whether printing can be executed, and arranges this character string data in the first template data 34.

Moreover, if necessary, the generating unit 76 further uses the state variable stored in the RAM 50 to generate the web page data. For example, in the web page data generated using the first template data 34, images indicating an ink remaining amount for each color of the multi-function device 10 (see FIG. 3) are represented in the areas "BK", "Y", "C" and "M". Using the state variable indicating the ink remaining amount stored in the RAM 50, the generating unit 76 arranges the images indicating the ink remaining amount for each color in the areas "BK", "Y", "C" and "M" of the first template data 34.

(Configuration of Second Template Data 36)

Figure 4:
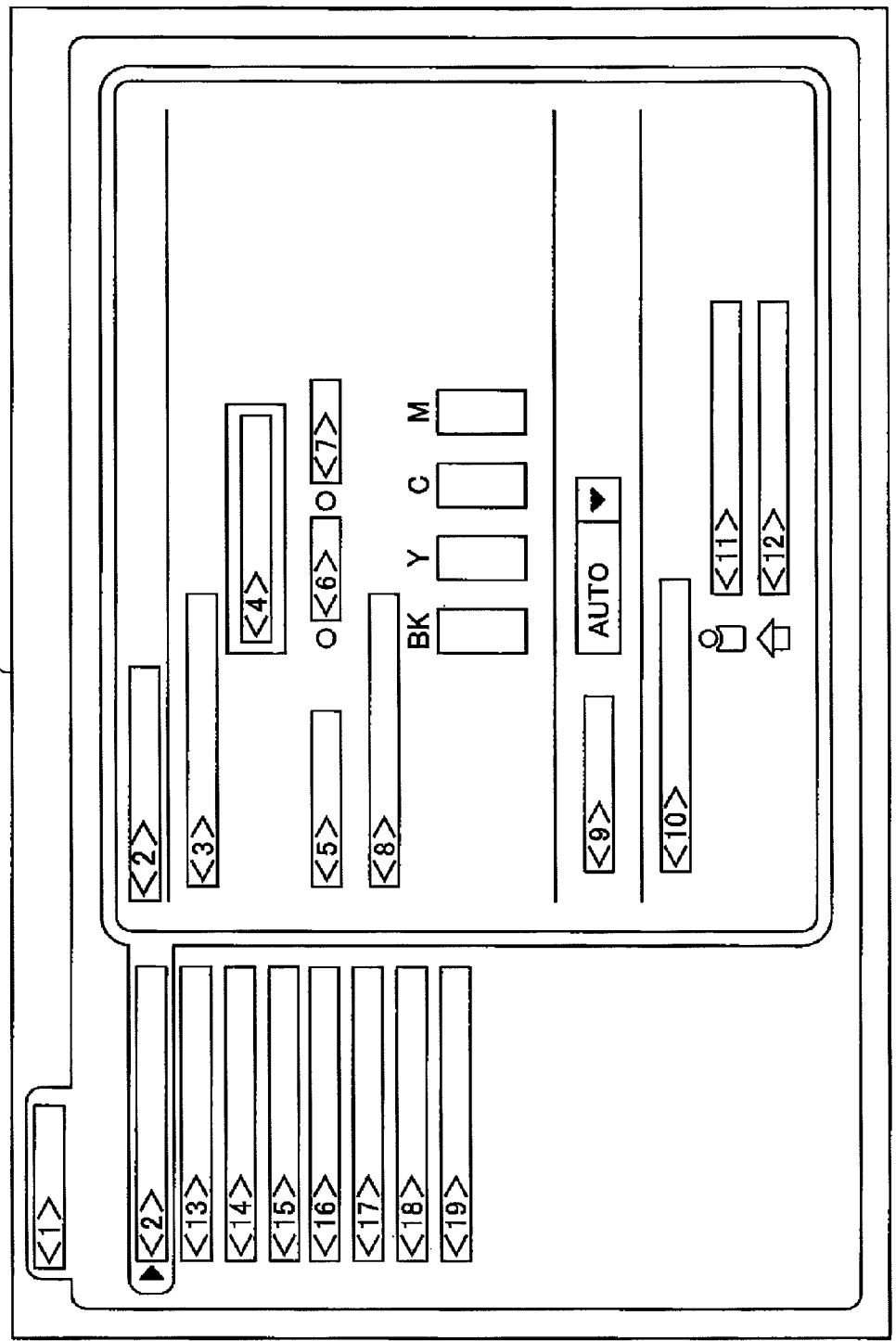
FIG. 4 shows an example of an image represented by second template data.

The second template data 36 is stored in combination with language information indicating Japanese and Chinese. Moreover, the same URLs as for the first template data 34 are assigned to the second template data 36. As shown in FIG. 4, in the second template data 36, a location of a plurality of character string IDs is determined for each of the character string IDs from <1> to <19>. These character string IDs are the same as those included in the first template data 34. That is, the web page data generated using the second template data 36 and the web page data generated using the first template data 34 represent the same information (a screen indicating status, etc. shown in FIG. 3). However, the corresponding languages differ in the first template data 34 and the second template data 36. That is, in the present embodiment, in a case of wanting to acquire information concerning the status, etc. shown in FIG. 3, a user can designate the same URL regardless of the language (i.e., English, German, Japanese or Chinese) desired by the user.

In the second template data 36, the location of some of the character string IDs from among the character string IDs <1> to <19> differs from the first template data 34. Specifically, the location of the character string IDs <17> to <19> of the first template data 34 is lower than the location of the character string IDs <17> to <19> of the second template data 36. The Japanese or Chinese character string arranged at the location of the character string ID <16> of the second template data 36 is a shorter character string than the English or German character string arranged at the location of the character string ID <16> of the first template data 34. Consequently, the location (i.e., area) of the character string ID <16> of the second template data 36 is determined so that the Japanese or Chinese character string arranged at the location of the character string ID <16> of the second template data 36 is arranged on one line. By contrast, the location (i.e., area) of the character string ID <16> of the first template data 34 is determined so that the English or German character string arranged at the location of the character string ID <16> of the first template data 34 is arranged on two lines (see FIG. 3). That is, the area of the character string ID <16> of the first template data 34 is larger than the area of the character string ID <16> of the second template data 36. Consequently, the location of the character string IDs <17> to <19> of the first template data 34 is lower than the location of the character string IDs <17> to <19> of the second template data 36.

In the first template data 34 and the second template data 36, the same character string IDs <17> to <19> have differing locations (i.e., location on the image (on the web page)). In other words, in a case where two images represented by the two pieces of template data 34, 36 were superimposed, there would be no overlapping of e.g., the two areas corresponding to the character string ID <17>. On the other hand, in the first template data 34 and the second template data 36, e.g., the two areas corresponding to the character string ID <16> have differing sizes. In other words, in a case where the two images represented by the two pieces of template data 34, 36 were superimposed, there would be overlapping of only a part of e.g., the two areas corresponding to the character string ID <16>. The expression "the character strings have differing locations on the image" is a concept including both the case of two areas corresponding to two character strings with the same meaning not overlapping at all, and the case of only partial overlapping of two areas corresponding to two character strings with the same meaning.

(Configuration of Third Template Data 38)

Figure 5:
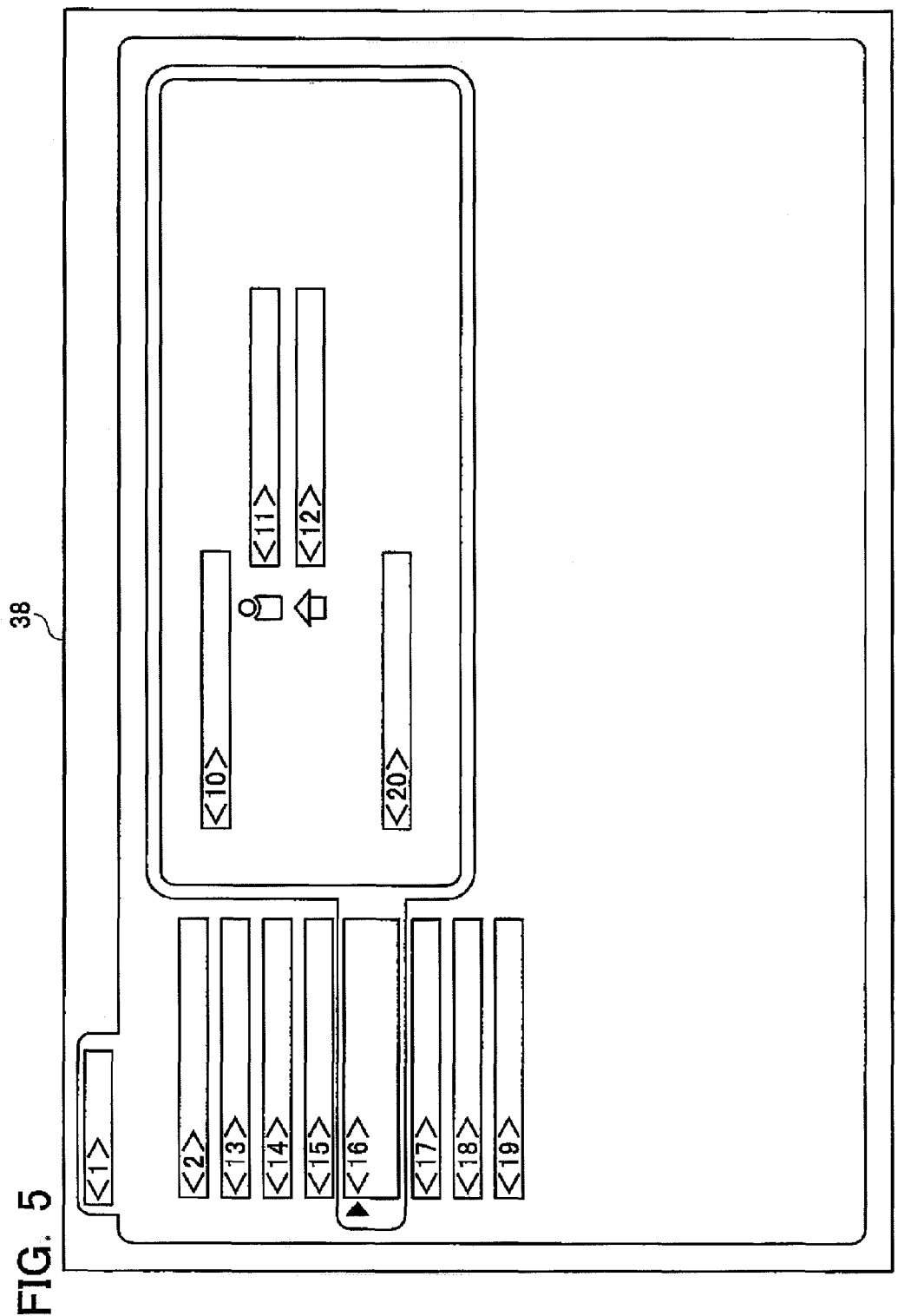
FIG. 5 shows an example of an image represented by third template data.

The third template data 38 is stored in combination with language information indicating English and German. Moreover, a URL different from the first and second template data 34, 36 is assigned to the third template data 38. This is because the web page data generated using the third template data 38 represents a web page which represents information different from the web page data generated using the first and second template data 34, 36. As shown in FIG. 5, the third template data 38 includes the character string IDs <10> to <12>, which are in common with some of the character string IDs <1> to <19> included in the first template data 34. The third template data 38 further includes a character string ID <20> (e.g., corresponding to "owner information" indicating an owner of the multi-function device 10), which differs from the character string IDs <1> to <19> included in the first template data 34. Moreover, a character string ID which corresponds to (in combination with the dynamic variables) a character string indicating the status of the multi-function device 10 (i.e., dynamic information) is not present in the character string IDs <10> to <12>, <20> included in the third template data 38.

As shown in FIG. 1, the RAM 50 comprises a character string table 60 capable of temporarily recording the character string data, etc. which the first acquiring unit 72 has acquired from the data server 100. The RAM 50 has a work area utilized when the CPU 20 executes processes according to the program 32. Moreover, the RAM 50 is a non-volatile memory (e.g., NVRAM). Moreover, in a variant, the RAM 50 may be a volatile memory (e.g., SDRAM).

The RAM 50 stores the state variables representing the current status of the multi-function device 10 (the state variable concerning whether printing can be performed, the state variable concerning the ink remaining amount etc.). For example, in a case where the multi-function device 10 is currently able to print, the state variable concerning whether printing can be performed is "1", and in a case where the multi-function device 10 is currently unable to print, the state variable concerning whether printing can be performed is "2". Moreover, the state variables are changed by the CPU 20. Further, character string data corresponding to one type of language is recorded in the character string table 60. For example, in a case where German character string data is to be recorded in the character string table 60 while Japanese character string data is in a recorded state in the character string table 60, the storage control unit 84 deletes all the Japanese character string data that was recorded in the character string table 60. Further, one piece of character string data in combination with one character string ID is recorded in the character string table 60. For example, in a case where a combination of the character string ID <4> and character string data "printing unavailable" is to be recorded in the character string table 60 while a combination of the character string ID <4> and character string data "printing available" is in a recorded state, the storage control unit 84 deletes the combination of the character string ID <4> and the character string data "printing available", and records the combination of the character string ID <4> and the character string data "printing unavailable".

(Configuration of Data Server 100)

The data server 100 stores a plurality (two in FIG. 1) of character string tables 110, 120. In the present embodiment, the character string table 110 is a Japanese character string table 110 and the character string table 120 is a German character string table 120. The character string tables 110, 120 include a combination of a character string ID and a character string. The character strings which represent the same information in the English character string table 40 in the multi-function device 10 and in the character string tables 110, 120 in the data server 100 are recorded in combination with the same character string ID.

(Configuration of Translation Server 200)

Upon receiving a translation request packet from the multi-function device 10, this translation request packet including language specifying information and a combination of the character string ID and the character string, the translation server 200 translates the character string included in the translation request packet into the language type specified by the language specifying information. Then, the translation server 200 sends the translated character string to the multi-function device 10 in combination with the character string ID included in the translation request packet.

(Configuration of PC 300)

The PC 300 comprises a display unit 302, an operation unit 304 and a control unit 306. The control unit 306 comprises a CPU 310 and the web browser program 312. According to the web browser program 312, the CPU 310 causes the web page data supplied from the multi-function device 10 to be displayed in the display unit 302.

(Web Page Data Sending Process Executed by Multi-Function Device)

Next, the contents of the web page data sending process of FIG. 6 executed by the multi-function device 10 will be described. Upon receiving a web page request packet from the PC 300, the control unit 12 of the multi-function device 10 starts the web page data sending process. In detail, by operating the operation unit 304, the user of the PC 300 can instruct the PC 300 to send the web page request packet to the multi-function device 10. First, by operating the operation unit 304, the user of the PC 300 activates the web browser program 312. Then, the user of the PC 300 specifies a URL from among the URLs of the plural pieces of template data 34 to 38.

For example, if wanting to acquire information concerning the status of the multi-function device 10, the user specifies the URL of the first template data 34 (which is the same URL as the URL of the second template data 36). Further, for example, if wanting to acquire information concerning the location of the multi-function device 10 and a contact address of an administrator, the user specifies the URL of the third template data 38. Moreover, for example, specifying the URL may be performed by the user directly inputting a URL character string, or by the user selecting a hyperlink character string on a web page.

When the URL is specified, the control unit 306 generates a web page request packet that includes the specified URL and language information indicating the language (e.g., Japanese, English, etc.) set in the web browser program 312, and sends the web page request packet to the multi-function device 10.

Upon receiving the web page request packet, in S12 the generating unit 76 of the multi-function device 10 selects, from the ROM 30, the template data to which the URL included in the web page request packet has been assigned. Moreover, for example, the same URL is assigned to the first and second template data 34, 36. Consequently, in a case where this URL is included in the web page request packet, the generating unit 76 selects the first and second template data 34, 36. In this case, the generating unit 76 further selects, from among the first and second template data 34, 36, the template data that is in combination with the language information matching the language information included in the web page request packet. For example, in a case where the language information included in the web page request packet indicates English, the generating unit 76 selects the first template data 34. In a case where the language information indicates Japanese, the generating unit 76 selects the second template data 36.

One or more character string IDs are included in the template data selected in S12. In S14, the generating unit 76 identifies one character string ID from among the one or more character string IDs (e.g., the character string IDs <1> to <19>) included in the template data selected in S12 (e.g., the first template data 34). Processes S16 to S37 (to be described) are executed for the one character string ID identified in S14. In S14, a character string ID is identified for which the processes S16 to S37 have not yet been executed. Moreover, below, one character string ID identified in S14 is called a "specific character string ID".

In S16, the generating unit 76 determines whether the specific character string ID is the character string ID of a character string representing the status of the multi-function device 10. Specifically, referring to the English character string table 40, the generating unit 76 determines whether the specific character string ID is combined with a dynamic variable whose value is other than "0". In a case where the dynamic variable combined with the specific character string ID is "0", NO is determined in S16. In a case where the dynamic variable combined with the character string ID identified in S14 is a value other than "0", YES is determined in S16. For example, in the case where the character string ID <4> was identified in S14, YES is determined in S16. Further, for example, in the case where the character string ID <1> was identified in S14, NO is determined in S16. In the case of YES in S16, the process proceeds to S18, in the case of NO in S16, S18 is skipped and the process proceeds to S20.

In S18, the detecting unit 78 detects the current status of the multi-function device 10. For example, in the case where the character string ID <4> was identified in S14, the detecting unit 78 identifies the state variable corresponding to the character string ID <4> stored in the RAM 50 (i.e., the state variable concerning whether printing can be performed ("1" or "2")). Thereby, the status regarding whether the multi-function device 10 can currently perform printing is detected.

In S20, the generating unit 76 determines whether the language information included in the web page request packet indicates English (i.e., matches the language of the English character string table 40 stored in the ROM 30). In a case where the language information indicates English (YES in S20), S21, S22, S24 are skipped, and the process proceeds to S26. In the case where the language information indicates a language other than English (Japanese, German, etc.) (NO in S20), the process proceeds to S21.

In S21, the generating unit 76 determines whether the language indicated by the language information included in the web page request packet matches the language of the character string data stored in the character string table 60 of the RAM 50. In a case of YES in S21, the generating unit 76 proceeds to S22. In a case of NO in S21, the generating unit 76 proceeds to S23. For example, under a state in which Japanese character string data is recorded in the character string table 60 of the RAM 50, if Japanese web page data is requested, the web page data can be generated using the character string data in the character string table 60. In this case, the generating unit 76 proceeds to S22. On the other hand, for example, under the state in which the Japanese character string data is recorded in the character string table 60 of the RAM 50, if German web page data is requested, the web page data cannot be generated using the character string data in the character string table 60. In this case, the process proceeds to S23. In S23, the storage control unit 84 deletes all the combinations of character string ID and character string data recorded in the character string table 60, and the process proceeds to S28. Moreover, in S23, in the state where character string data is not recorded in the character string table 60 of the RAM 50, S23 is skipped.

In S22, the generating unit 76 determines whether the specific character string ID is being stored in the character string table 60. For example, in a state where the character string table 60 including the character string IDs <1> to <19> was stored in the RAM 50 in an earlier web page data sending process, YES is determined in S22 if the specific character string ID is any of the character string IDs <1> to <19>. Further, for example, NO is determined in S22 if the specific character string ID is <20> in the above state. In the case of YES in S22, the process proceeds to S24. In the case of NO in S22, the process proceeds to S28.

In S24, the generating unit 76 determines whether the character string representing the status detected in S18 is being stored in the character string table 60. Specifically, the generating unit 76 determines whether character string data, in which the specific character string ID (e.g., the character string ID <4>) and a dynamic variable that matches the state variable identified in S18 (e.g., "1") are combined, is present in the character string table 60.

For example, when the character string data of the character string ID <4> was acquired earlier, if the status concerning whether the multi-function device 10 can perform printing indicated that printing could not be performed, then character string data indicating "printing unavailable" is acquired in S28 (to be described) and, in S32 (to be described), the character string ID <4>, the dynamic variable "2" and the character string data is recorded. However, in this case, the character string data "printing available" indicating that printing can be performed is not acquired, and consequently the character string ID <4>, the dynamic variable "1" and the character string data are not recorded. In this state, e.g., in the case where the status concerning whether the multi-function device 10 can currently perform printing indicates that printing cannot be performed, the state variable "2" is identified in S18. Consequently, in S24, character string data, in which the character string ID <4> and the dynamic variable "2" that matches the state variable "2" are combined, is determined to be present in the character string table 60 (YES in S24). On the other hand, e.g., in a case where the status concerning whether the multi-function device 10 can currently perform printing indicates that printing can be performed, the state variable "1" is identified in S18. Consequently, in S24, character string data, in which the character string ID <4> and the dynamic variable "1" that matches the state variable "1" are combined, is determined to not be present in the character string table 60 (NO in S24). In the case of NO in S24, the process proceeds to S28. In the case of YES in S24, the process proceeds to S26. Moreover, in a case where NO was determined in S16 and the process S18 was skipped, YES is determined in S24, and the process proceeds to S26.

In S26, the generating unit 76 identifies the character string data combined with the specific character string ID from the English character string table 40 or the character string table 60. In S26, which is executed in the case of YES in S20 (i.e., in the case where English web page data is requested), the generating unit 76 identifies the character string data recorded in the English character string table 40 in combination with the specific character string ID. Moreover, in the case where the state variable is identified in S18, the generating unit 76 identifies the character string data recorded in the English character string table 40 in combination with the character string ID identified in S14 and the dynamic variable that matches the state variable identified in S18.

Further, in S26, which is executed in the case of YES in S24 (i.e., in the case web page data of a language other than English is requested and the character string data of the requested language is recorded in the character string table 60), the generating unit 76 identifies the character string data recorded in the character string table 60 of the RAM 50 in combination with the specific character string ID. When S26 ends, the process proceeds to S37.

In S28, the first acquiring unit 72 requests character string data from the data server 100. Specifically, the first acquiring unit 72 sends a character string request packet to the data server 100. The character string request packet includes the specific character string ID and the language information included in the web page request packet. Moreover, in the case where the state variable is identified in S18, the first acquiring unit 72 further sends a character string request packet that includes the state variable to the data server 100. After receiving a web page data request from the PC 300, the first acquiring unit 72 acquires the character string data. Generally, after specific information has been requested from the display unit (with specific information being requested from the display unit as a trigger), the first acquiring unit 72 acquires the specific data from the data server 100.

Upon receiving the character string request packet, the data server 100 determines whether the data server stores a character string table of the language indicated in the language information in the character string request packet. In a case where the character string table is not being stored, the data server 100 sends a packet, indicating that the character string data cannot be sent, to the multi-function device 10. On the other hand, in a case where the character string table is being stored, the data server 100 identifies, from within the character string table of the language indicated in the language information in the character string request packet, the character string data recorded in combination with the character string ID in the character string request packet. Moreover, in a case where a state variable is included in the character string request packet, the data server 100 identifies the character string data recorded in combination with the character string ID included in the character string request packet and the dynamic variable that matches the state variable included in the character string request packet.

Next, the data server 100 sends a combination of the identified character string, the character string ID and the dynamic variable (in a case where the dynamic variable is combined) to the multi-function device 10. That is, in the present embodiment, in the case where the state variable is included in the character string request packet, the data server 100 sends only the character string data combined with the dynamic variable that matches the state variable, and does not send character string data combined with dynamic variables not matching the state variable.

Moreover, in a variant, the first acquiring unit 72 may send a character string request packet to the data server 100, the character string request packet including the language information indicating the language identified in S20, and not including the character string ID and the state variables. In this case, in response to the character string request packet, the data server 100 may send a packet including the entire character string table of the language indicated by the language information in the character string request packet to the multi-function device 10.

In S30, the first acquiring unit 72 determines whether the packet received from the data server 100 is a packet that includes character string data. In a case where character string data is included (YES in S30), in S32 the storage control unit 84 records, in the character string table 60 of the RAM 50, a combination of the character string data included in the packet acquired in S30 and the character string ID, and proceeds to S37. In a case where the dynamic variable is further included in the packet acquired in S30, the storage control unit 84 further combines the dynamic variable and records in the character string table 60. Moreover, in a case where a combination having a matching character string ID has already been recorded in the character string table 60, i.e., in a case where a combination has been recorded that has a matching character string ID but non-matching dynamic variable, the storage control unit 84 deletes that combination, and records, in the character string table 60, the combination included in the packet acquired in S30.

Moreover, in a case where there is little free space in the RAM 50, the storage control unit 84 deletes the combination of the character string recorded in S32 and the character string ID from the RAM 50. For example, in a case where a print instructing packet is received from an external device (e.g., the PC 300), the control unit 12 performs a conversion process using the RAM 50 in order to convert print target data included in the print instructing packet into print data. In a case where the free space of the RAM 50 is smaller than the work area required to execute the conversion process, the storage control unit 84 deletes the combination of the character string recorded in S32 and the character string ID from the RAM 50. According to this configuration, the control unit 12 can perform the process properly.

On the other hand, in a case where the packet received in S30 is a packet indicating that the character string data cannot be sent (NO in S30), in S34 the second supplying unit 82 sends a translation request packet to the translation server 200. The translation request packet includes a combination of the specific character string ID and the character string data recorded in the English character string table 40 in combination with the specific character string ID. Moreover, the translation request packet includes the language information included in the web page request packet.

In a case where the translation server 200 can translate the character string data included in the translation request packet into the language indicated by the language information included in the translation request packet, the translation server 200 translates the character string data included in the translation request packet. Then, the translation server 200 sends a translated packet that includes a combination of translated character string data and the character string ID to the multi-function device 10. On the other hand, in a case of being unable to translate the character string data, the translation server 200 sends a translation unavailable packet indicating that translation cannot be executed to the multi-function device 10.

In S36, the second acquiring unit 80 monitors whether a packet has been received from the translation server 200 as a response to the translation request packet. In a case where the second acquiring unit 80 has received the translated packet from the translation server 200 (YES in S36), the process proceeds to S37. On the other hand, in a case where the second acquiring unit 80 has received a translation unavailable packet from the translation server 200 (NO in S36), the second supplying unit 82 sends the translation request packet to a translation server (not shown) that is different from the translation server 200 (S34). The second supplying unit 82 continues changing the translation server and sending the translation request packet until the second acquiring unit 80 receives the translated packet (YES in S36).

In S37, using the specific character string ID and either the character string data identified in S26 or the character string data acquired in S30 or S36, the generating unit 76 arranges (writes) the character string data at the location of the specific character string ID in the template data selected in S12.

Next, in S38, the generating unit 76 determines whether, in S14, the processes S16 to S37 have been executed for all the character string IDs included in the template data selected in S12. In the case of NO in S38, the process returns to S14, and newly identifies one character string ID. In the case of YES in S38, all the character string data is arranged at (written into) the location of all the character string IDs included in the template data selected in S12. That is, the web page data requested from the PC 300 has been generated. In this case, in S40, the first supplying unit 74 sends the web page data generated in S37 to the PC 300, and ends the web page data sending process.

Effects of Present Embodiment

The multi-function device 10 of the present embodiment was described in detail. Using FIGS. 7 to 10, the effects of the present embodiment will be described together with specific examples of the operation of the devices 10, 100, 200, 300 in a case where a web page data request packet is received from the PC 300.

(Case where English Web Page Data is Requested from PC)

As shown in FIG. 7, the PC 300 sends, in accordance with an operation by the user, a web page request packet requesting English web page data (a packet including the URL of the first template data 34 and language information indicating English) to the multi-function device 10. Upon receiving the web page request packet from the PC 300, the multi-function device 10 generates English web page data using the first template data 34 and the English character string table 40 (S14 to S38 of FIG. 6). Then, the multi-function device 10 sends the generated English web page data to the PC 300 (S40 of FIG. 6). Thereby, the PC 300 can display the English web page data in the display unit 302.

In the case of FIG. 7, the multi-function device 10 can generate the web page data using the first template data 34 and the English character string table 40 which are both being stored in the multi-function device 10. That is, the multi-function device 10 need not acquire the character string data from an external device such as the data server 100, etc. Consequently, the communication load on the network system 2 can be reduced. Further, compared to a configuration which acquires the character string data from an external device such as the data server 100, etc., the time from receiving the web page data request packet to sending the web page data can be reduced. If the multi-function device 10 is sold in an English speaking region, in general, English web page data will be requested frequently. By storing the character string data of the frequently requested language in advance in the multi-function device 10, the situation can be suppressed in which the multi-function device 10 needs to acquire data from the servers 100, 200 frequently.

(Case where Japanese Web Page Data is Requested from PC)

As shown in FIG. 8, the PC 300 sends, in accordance with an operation by the user, a web page request packet requesting Japanese web page data (a packet including the URL of the second template data 36 and language information indicating Japanese) to the multi-function device 10. Upon receiving the web page request packet, the multi-function device 10 detects the current status of the multi-function device 10 (e.g., whether printing can be performed) (S18 of FIG. 6). Moreover, the current status of the multi-function device 10 is "printing available" (i.e., the state variable is "1").

If it is determined that Japanese character string data is not being stored in the RAM 50 (NO in S21 of FIG. 6), the multi-function device 10 sends a character string request packet requesting the Japanese character string data to the data server 100 (S28 of FIG. 6). The data server 100 sends the Japanese character string data to the multi-function device 10 in accordance with the character string request packet. Upon receiving the Japanese character string data (YES in S30 of FIG. 6), the multi-function device 10 records the character string data in the RAM 50 (S32 of FIG. 6). According to this configuration, the same character string data need not be acquired from the data server 100 in the web page data sending process to be performed in future.

The multi-function device 10 generates the Japanese web page data (S14 to S38 of FIG. 6) by acquiring, for each character string ID included in the second template data 36, the Japanese character string data from the data server 100 and arranging the acquired Japanese character string data in the second template data 36. The multi-function device 10 sends the generated Japanese web page data to the PC 300 (S40 of FIG. 6). Thus, the PC 300 can display the Japanese web page data in the display unit 302.

In the case of FIG. 8, the multi-function device 10 cannot generate the Japanese web page data requested from the PC 300 even if the multi-function device 10 uses the English character string table 40 which the multi-function device 10 stores. Since the memory (the ROM 30, RAM 50, etc.) of the multi-function device 10 is limited, the memory of the multi-function device 10 cannot store the character string data of all the languages that could be requested from the external device (e.g., the PC 300). In this case, the multi-function device 10 can generate the Japanese web page data by acquiring the Japanese character string data from the data server 100. According to this configuration, even if the character string data of the requested language is not being stored in the memories 30, 50, the multi-function device 10 can supply the web page data of the requested language to the PC 300 in response to the request from the PC 300. That is, the multi-function device 10 can increase the variety of languages of web page data it can send to the PC 300 without increasing the variety of languages that the multi-function device 10 stores in advance. The multi-function device 10 may appropriately supply web page data representing images that include information described in the requested language to the PC 300.

Further, the multi-function device 10 stores the template data 34, etc. in advance in the ROM 30. Thereby, the size of the data acquired from the data server 100 can be made smaller than in the case of acquiring the web page data itself from the data server 100. Further, the multi-function device 10 acquires the Japanese character string data from the data server 100 after receiving the web page request packet from the PC 300. Consequently, in a situation where the multi-function device 10 is installed in an environment where Japanese web pages are not supplied, the multi-function device 10 need not acquire the Japanese character string data. Consequently, the load on the LAN 4 can be reduced.

Next, the PC 300 sends, in accordance with an operation of the user, a second web page request packet to the multi-function device 10. Upon receiving the web page request packet, the multi-function device 10 detects the current status of the multi-function device 10 (whether printing can be performed). The current status of the multi-function device 10 is "printing unavailable" (i.e., the state variable is "2"). In this case, the web page data cannot be generated using the character string, representing the status, which was acquired the previous time from the data server and which is stored in the RAM 50 (NO in S24 of FIG. 6). On the other hand, the URL included in the previous web page request packet and the URL included in the present web page request packet are identical. Consequently, the character string data stored in the RAM 50, other than the character string data representing the status of the multi-function device 10 (i.e., the character string data combined with character string IDs other than the character string ID <4>) can be used to generate the web page data (YES in S22 of FIG. 6).

The multi-function device 10 needs to acquire the Japanese character string indicating the current status of the multi-function device 10 (i.e., "printing unavailable") from the data server 100. The multi-function device 10 sends a character string request packet to the data server 100. The character string request packet includes the character string ID <4> of the status to be acquired and the state variable "2", and not including other character string IDs and other state variables (S28 of FIG. 6). The data server 100 sends the Japanese character string data in response to the character string request packet. Upon receiving the Japanese character string data (S30 of FIG. 6), the multi-function device 10 stores the received character string data in the RAM 50 instead of the character string data representing the status that was being stored in the RAM 50 (S32 of FIG. 6).

Next, the multi-function device 10 generates web page data using the second template data 36 and the Japanese character string data that is being stored in the RAM 50. The multi-function device 10 sends the generated web page data to the PC 300 (S40 of FIG. 6). In this configuration, the multi-function device 10 generates the web page data using the character string data that was already being stored in the RAM 50. Consequently, the size of the data acquired from the data server 100 can be made smaller than in the case of acquiring all the character string data from the data server 100. Further, according to this configuration, web page data that includes character string data properly representing the current status of the multi-function device 10 can be supplied to the PC 300.

Further, in a case where the character string data representing status that is being stored in the RAM 50 does not represent the current status of the multi-function device 10, the multi-function device 10 acquires character string data representing the current status of the multi-function device 10 from the data server 100. Thereby, web page data that includes a character string properly representing the current status of the multi-function device 10 can be supplied to the PC 300.

(Case where German Web Page Data is Requested from PC)

Figure 9:
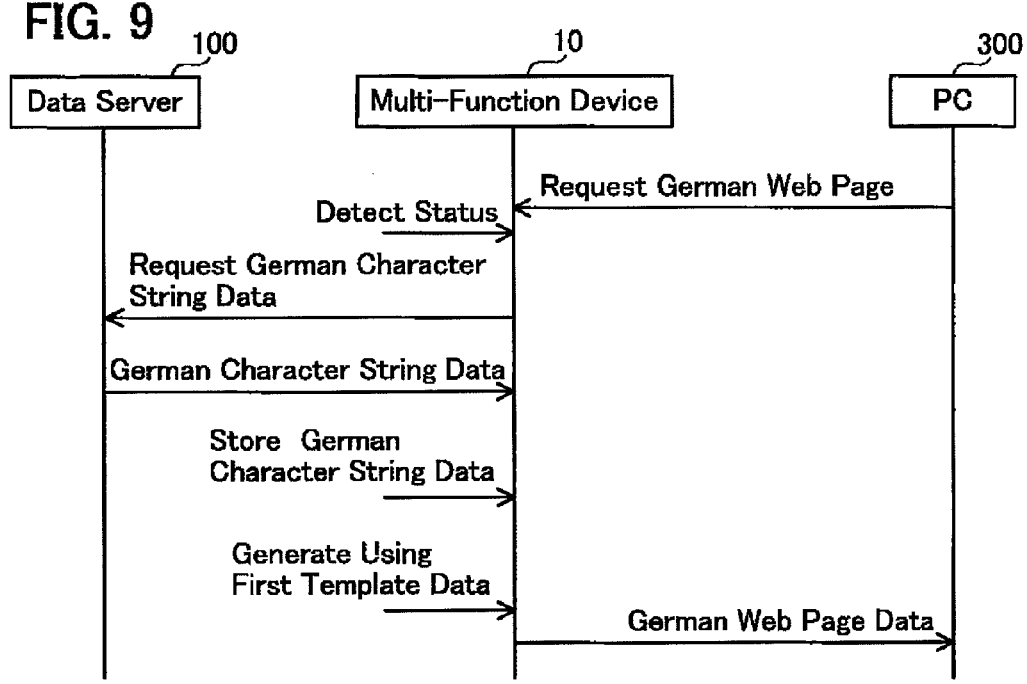
FIG. 9 shows a sequence diagram showing operations of devices in a case where the PC requests German.

As shown in FIG. 9, the PC 300 sends, in accordance with an operation by the user, a web page request packet requesting German web page data (a packet including the URL of the first template data 34 and language information indicating German) to the multi-function device 10. Upon receiving the German web page request packet from the PC 300, the multi-function device 10 detects the current status of the multi-function device 10 (e.g., whether printing can be performed).

If it is determined that German character string data is not being stored in the RAM 50 (NO in S22 of FIG. 6), the multi-function device 10 sends a character string request packet requesting German character string data to the data server 100 (S28 of FIG. 6). The data server 100 sends the German character string data in response to the character string request packet. Upon receiving the German character string data (S30 of FIG. 6), the multi-function device 10 stores the character string data in the RAM 50 (S32 of FIG. 6).

Next, the multi-function device 10 generates the German web page data using the first template data 34 and the German character string data acquired from the data server 100 (S14 to S38 of FIG. 6). The multi-function device 10 sends the generated German web page data to the PC 300 (S40 of FIG. 6). Thereby, the PC 300 can display the German web page data in the display unit 302.

In the case of FIG. 9, if the character string data of the requested language is not being stored in the memories 30, 50, the multi-function device 10 can supply, as with the case of FIG. 8, web page data of the requested language to the PC 300 in response to a request from the PC 300. Further, by changing the template data in accordance with the language, web page data can be generated that represents a web page in which the character strings are arranged properly. Further, the template data used for generating the web page data differs in the case of Japanese web page data being requested, and in the case of German web page data being requested. According to this configuration, the multi-function device 10 can generate appropriate web page data using the template data according to the requested language.

Moreover, the web page request packet could be received after the case of FIG. 9. For example, whereas a first URL is the URL of the first template data 34, a second URL could be the URL of the third template data 38. The part of the character string IDs <1>, <2> . . . <19> is in common in the first template data 34 and the third template data 38. That is, at the stage where a second web page request packet is received, the character string data of the character string IDs <1>, <2> . . . <19>, which are in common, is already being stored in the RAM 50.

However, the character string ID <20>, which is not included in the first template data 34, is included in the third template data 38. Consequently, after receiving the second web page request packet, the multi-function device 10 needs to acquire only the character string data of the character string ID <20> that is not being stored in the RAM 50. Generally speaking, the acquired specific data includes the specific character string data. After the acquired specific data used for generating image data representing an image that includes the specific information represented in the specific language has been stored in the information memory, if other information different from the specific information is requested then, if both the specific character string data and other character string data different from the specific character string data are necessary, the other character string data is acquired from the data server without the specific character string data being acquired from the data server.

(Case where Chinese Web Page Data is Requested from PC)

Figure 10:
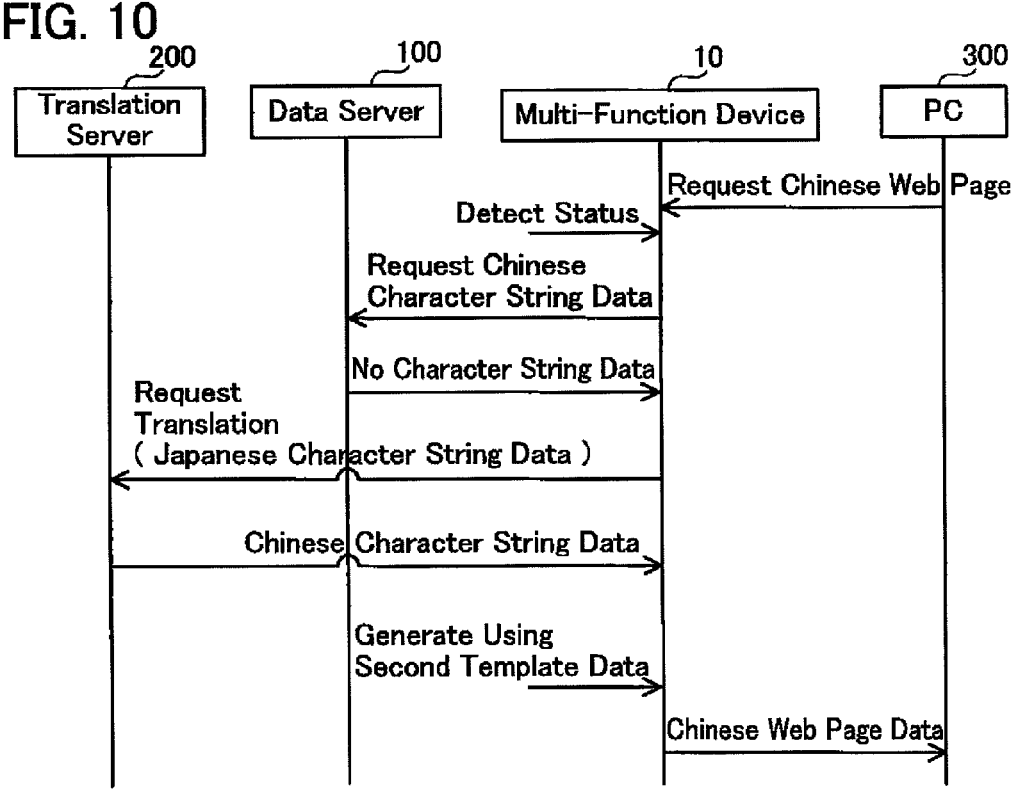
FIG. 10 shows a sequence diagram showing operations of devices in a case where the PC requests Chinese.

As shown in FIG. 10, the PC 300 sends, in accordance with an operation by the user, a web page request packet requesting Chinese web page data (a packet including the URL of the second template data 36 and language information indicating Chinese) to the multi-function device 10. Upon receiving the Chinese web page request packet from the PC 300, the multi-function device 10 detects the current status of the multi-function device 10.

The multi-function device 10 sends a character string request packet requesting Chinese character string data to the data server 100 (S28 of FIG. 6). The data server 300 is not storing a Chinese character string table. Consequently, in response to the character string request packet, the data server 100 sends a packet to the multi-function device 10 indicating it cannot send the character string data.

Using the character string ID identified in S14 of FIG. 6, the multi-function device 10 identifies character string data from the English character string table 40 that is being stored in the ROM 30. Then, the multi-function device 10 sends a translation request packet to the translation server 200. The translation request packet includes the identified character string data and language information indicating Chinese (834 of FIG. 6).

Upon receiving the translation request packet, the translation server 200 translates the character string represented by the character string data included in the translation request packet into Chinese. The translation server 200 sends the translated character string data to the multi-function device 10. Using the Chinese character string data received from the translation server 200 and the second template data 36, the multi-function device 10 generates Chinese web page data (S14 to S38 of FIG. 6). The multi-function device 10 sends the Chinese web page data to the PC 300 (S40 of FIG. 6). Thereby, the PC 300 can display the Chinese web page data in the display unit 302.

In the case of FIG. 10, the multi-function device 10 cannot generate the Chinese web page data using the English character string table 40 that is being stored in the multi-function device 10. Further, the multi-function device 10 cannot acquire Chinese character string data from the data server 100. In this case, by sending the English character string data that the multi-function device 10 stores to the translation server 200, the multi-function device 10 causes the English character string data to be translated into Chinese character string data. According to this configuration, the multi-function device 10 can generate web page data using the character string data of a language that neither the multi-function device 10 nor the data server 100 stores. The multi-function device 10 can supply the Chinese web page data to the PC 300 in response to the request from the PC 300.

If the user, using the PC 300 that comprises the web browser program 312, requests specific information described in a desired language from the multi-function device 10, the user can see a web page that includes the specific information.

(Corresponding Relationships)

The multi-function device 10 is an example of the "communication device". The display unit 302 of the PC 300 is an example of the "display unit". The ROM 30 is an example of the "first information memory" and the "location data memory", and the RAM 50 is an example of the "second information memory".

The character string data recorded in the English character string table 40 is an example of the "first specific data", the Japanese character string data acquired from the data server 100 is an example of the "second specific data", the German character string data acquired from the data server 100 is an example of the "third specific data" and the Chinese character string data sent from the translation server 200 is an example of the "fourth specific data". The first template data 34 is an example of the "first location data", and the second template data 36 is an example of the "second location data".

(Variants)

(1) In the above embodiment, the generating unit 76 generates the English web page data using the English character string table 40 and the first template data 34. Instead, the multi-function device 10 may store the English web page data itself in the ROM 30. In this case, the multi-function device 10 may complete the English web page data by acquiring the information indicating the status of the multi-function device 10 from the English character string table 40, etc. and adding the information indicating the status to the English web page data. In this variant, the English web page data is an example of the "first specific data".

(2) In the above embodiment, the first acquiring unit 72 acquires the character string data from the data server 100. Instead, the first acquiring unit 72 may acquire the Japanese, etc. web page data from the data server 100. That is, the data server 100 may be storing Japanese web page data, etc. instead of the Japanese character string table 110, etc. In this case, the generating unit 76 need not generate the web page data. In this variant, the Japanese web page data is an example of the "second specific data".

(3) In the above embodiment, the second supplying unit 82 sends the English character string data recorded in the English character string table 40 to the translation server 200. Additionally, or instead, the second supplying unit 82 may send the Japanese character string data acquired from the data server 100 to the translation server 200. For example, the second supplying unit 82 may send the Japanese character string data and the English character string data simultaneously to the translation server 200. The translation server 200 may translate either one of the Japanese character string data or the English character string data. Alternatively, e.g., the second supplying unit 82 may first send the English character string data to the translation server 200. In a case where a packet indicating translation unavailable is sent back, the second supplying unit 82 may send the Japanese character string data to the translation server 200. In this configuration, e.g., in a case where the translation server 200 cannot translate from English to Chinese, but can translate from Japanese to Chinese, the multi-function device 10 can acquire the translated Chinese character string data from the translation server 200.

(4) In the above embodiment, the first acquiring unit 72 sends a character string request packet to the data server 100, the character string request packet including the one character string ID identified in S14 of FIG. 6. However, the first acquiring unit 72 may send a character string request packet that includes a plurality of character string IDs identified in S14 of FIG. 6 to the data server 100. In this case, the data server 100 may send a packet to the multi-function device 10 that includes plural pieces of character string data combined with the plurality of character string IDs included in the character string request packet.

(5) In the above embodiment, the first supplying unit 74 sends the web page data to the PC 300 in response to a web page request packet from the PC 300. However, the multi-function device 10 may supply the web page data to the display unit 14 in response to a request from the display unit 14 of the multi-function device 10. In this case, the display unit 14 is an example of the "display unit".

(6) In the above embodiment, in a case where the second acquiring unit 80 receives a translation unavailable packet from the translation server which is the translation server 200, etc. (NO in S36 of FIG. 6), the second supplying unit 82 sends the translation request packet to the other translation server (not shown) (S34 of FIG. 6). However, in a case where the translation unavailable packet is received from the translation server 200, etc. (NO in S36 of FIG. 6), in S37 of FIG. 6 the generating unit 76 may arrange the English character string data recorded in the English character string table 40, in combination with the character string ID identified in S14, at the location of the specific character string ID within the template data selected in S12. For example, the above process may be executed in a case where a translation unavailable packet is received from each of a plurality of predetermined translation servers. In this variant, web page data may be generated in which, from among a plurality of character strings within the web page data, part or all of the character strings are English character strings (i.e., the language recorded in the character string table of the ROM 30; the remaining character strings are translated by the translation server 200). The first supplying unit 74 may send the generated web page data to the PC 300. Moreover, in a case where all the character strings within the web page data are English character strings (i.e., character strings in a language differing from the requested language), the first supplying unit 74 may send sending unavailable information to the sending source device (i.e., the PC 300) of the web page request packet, indicating that web page data of the requested language cannot be sent.

(7) In the above embodiment, the units 72 to 84 are realized by the CPU 20 executing processes according to a program. However, at least one of the units 72 to 84 may be realized by hardware such as a logic circuit.

(8) The "communication device" need not be the multi-function device 10, but may be a communication device such as a printer, FAX, etc.

The invention claimed is:

1. A communication device to be connected with a data server via a network, the communication device comprising:
   one or more processors;
   a memory that stores a computer program including instructions executed by the one or more processors; and
   a first information memory that stores first specific data representing specific information described in a first language,
   wherein the instructions cause the one or more processors, when executed by the one or more processors, to function as:
   a first acquiring unit configured to acquire second specific data stored in the data server from the data server, the second specific data representing the specific information described in a second language different from the first language; and
   a first supplying unit configured to:
   supply first image data obtained using the first specific data within the first information memory to a display unit in a case where the specific information described in the first language is requested, the first image data representing a first image including the specific information described in the first language,
   supply second image data obtained using the acquired second specific data to the display unit in a case where the specific information described in the second language is requested, the second image data representing a second image including the specific information described in the second language; and
   a storage control unit configured to store the acquired second specific data in a second information memory, wherein
   in the case where the specific information described in the second language is requested after the acquired second specific data is stored in the second information memory, the first supplying unit is configured to supply the second image data obtained using the second specific data within the second information memory,
   the acquired second specific data includes first character string data representing a first character string and second character string data representing a second character string,
   if third character string data is necessary instead of the second character string data in the case where the specific information described in the second language is requested after the acquired second specific data is stored in the second information memory,
   the first acquiring unit is configured to acquire the third character string data from the data server without acquiring the first character string data from the data server, and
   the first supplying unit is configured to supply the second image data obtained using the first character string data included in the second specific data within the second information memory and the acquired third character string data.

2. The communication device as in claim 1, wherein
the first acquiring unit is configured to acquire the second specific data from the data server when the specific information described in the second language is requested.

3. The communication device as in claim 1, wherein
the specific information includes information related to a status of the communication device,
the instructions cause the one or more processors, when executed by the one or more processors, to further function as;
a detecting unit configured to detect a status of the communication device,
in a case where the detected status is a first status, the first acquiring unit is configured to acquire the second specific data representing the first described in the second language from the data server, and
in a case where the detected status is a second status different from the first status, the first acquiring unit is configured to acquire the second specific data representing the second status described in the second language from the data server.

4. The communication device as in claim 3, wherein
the acquired second specific data includes character string data representing a character string of the second language,
in a case where the detected status is the first status, the first acquiring unit is configured to acquire the second specific data including first status character string data corresponding to the first status and fourth character string data,
in a case where the detected status is the second status, the first acquiring unit is configured to acquire the second specific data including second status character string data corresponding to the second status and the fourth character string data.

5. The communication device as in claim 1, wherein
the acquired second specific data includes character string data representing a character string of the second language corresponding to the specific information,
the communication device further comprises:
a location data memory that stores first location data indicating a first character string location which is a location of a character string on an image,
the instructions cause the one or more processors, when executed by the one or more processors, to further function as:
a generating unit configured to generate, by using the first location data within the location data memory and the acquired second specific data, the second image data representing the second image in which the character string of the second language corresponding to the specific information is arranged at the first character string location in the case where the specific information described in the second language is requested, and the first supplying unit is configured to supply the generated second image data to the display unit in the case where the specific information described in the second language is requested.

6. The communication device as in claim 5, wherein the location data memory further stores second location data indicating a second character string location which is a location of a character string on an image, the second character string location different from the first character string location, the first supplying unit is configured to further acquire third specific data stored in the data server from the data server, the third specific data includes character string data indicating a character string of a third language corresponding to the specific information, the third language is different from the first and second languages, and in a case where the specific information described in the third language is requested, the generating unit is configured to generate, by using the second location data within the location data memory and the acquired third specific data, third image data representing a third image in which the character string of the third language corresponding to the specific information is arranged at the second character string location, and the first supplying unit is configured to supply the generated third image data to the display unit.

7. The communication device as in claim 1, wherein the instructions cause the one or more processors, when executed by the one or more processors, to further function as:

a second supplying unit configured to supply at least one data of the first specific data within the first information memory and the acquired second specific data to a translation server; and a second acquiring unit configured to acquire fourth specific data which the translation server generates by executing translation of a language by using the at least one data, the fourth specific data representing the specific data described in a fourth language different from the first and second languages, and in a case where the specific information described in the fourth language is requested, the first supplying unit is configured to supply fourth image data obtained using the acquired fourth specific data to the display unit, the fourth image data representing a fourth image including the specific information described in the fourth language.

8. The communication device as in claim 1, wherein the communication device is to connect with an external device comprising the display unit and a web browser via the network, in a case where the specific information described in the first language is requested from the external device, the first supplying unit is configured to supply to the external device the first image data having a format which the web browser is capable of interpreting; and in a case where the specific information described in the second language is requested from the external device, the first supplying unit is configured to supply to the external device the second image data having a format which the web browser is capable of interpreting.

9. A computer readable recording device including a computer program for a communication device to be connected with a data server via a network, the communication device comprising a first information memory that stores first specific data representing specific information described in a first language, the computer program including instructions for ordering one or more processes of the communication device to execute:

acquiring second specific data stored in the data server from the data server, the second specific data representing the specific information described in a second language different from the first language;

supplying first image data obtained using the first specific data within the first information memory to a display unit in a case where the specific information described in the first language is requested, the first image data representing a first image including the specific information described in the first language;

supplying second image data obtained using the acquired second specific data to the display unit in a case where the specific information described in the second language is requested, the second image data representing a second image including the specific information described in the second language; and storing the acquired second specific data in a second information memory, wherein in the case where the specific information described in the second language is requested after the acquired second specific data is stored in the second information memory, the second image data obtained using the second specific data within the second information memory is supplied to the display unit, the acquired second specific data includes first character string data representing a first character string and second character string data representing a second character string, if third character string data is necessary instead of the second character string data in the case where the specific information described in the second language is requested after the acquired second specific data is stored in the second information memory, the third character string data is acquired from the data server without acquiring the first character string data from the data server, and the second image data obtained using the first character string data included in the second specific data within the second information memory and the acquired third character string data is supplied to the display unit.

* * * * *